US011818013B1

(12) United States Patent
Jia et al.

(10) Patent No.: US 11,818,013 B1
(45) Date of Patent: Nov. 14, 2023

(54) FILTERED COMMUNICATIONS IN NETWORK OF NETWORKS

(71) Applicant: AT&T Intellectual Property I, L.P., Atlanta, GA (US)

(72) Inventors: Yupeng Jia, South Pasadena, CA (US); Rashmi Palamadai, Naperville, IL (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 18/083,467

(22) Filed: Dec. 16, 2022

(51) Int. Cl.
*G06F 15/173* (2006.01)
*H04L 41/122* (2022.01)
*H04L 41/0893* (2022.01)

(52) U.S. Cl.
CPC ........ *H04L 41/122* (2022.05); *H04L 41/0893* (2013.01)

(58) Field of Classification Search
CPC .......................... H04L 41/122; H04L 41/0893
See application file for complete search history.

(56) References Cited

U.S. PATENT DOCUMENTS

| | | | | |
|---|---|---|---|---|
| 10,070,344 | B1 * | 9/2018 | Dowlatkhah | ......... H04W 28/16 |
| 2020/0228397 | A1 * | 7/2020 | Chandrashekar | ....... H04L 67/60 |
| 2023/0073937 | A1 * | 3/2023 | Mujumdar | .............. H04L 41/40 |

OTHER PUBLICATIONS

Ferrus, R., et al., "On 5G Radio Access Network Slicing: Radio Interface Protocol Features and Configuration", IEEE Communications Magazine, 2018, 16 pages.
Ericsson, "Ericsson Dynamic Network Slice Selection" accessed from ericsson.com/network-slicing on Dec. 12, 2022, 7 pages.
Saboorian, T., Network Slicing and 3GPP Service and Systems Aspects (SA), Standard, IEEE Software Defined Networks, Dec. 2017, 7 pages.
Nokia, "Network Sharing: Delivering mobile broadband more efficiently and at lower cost", accessed from Nokia.com on Dec. 12, 2022, 15 pages.

* cited by examiner

*Primary Examiner* — Wing F Chan
*Assistant Examiner* — Joseph R Maniwang

(57) ABSTRACT

A processing system deployed in a communication network may detect a condition for merging at least a first logical network of the communication network and a second logical network of the communication network. The first logical network may be reserved for use by at least a first plurality of endpoint devices of at least a first public service entity, and the second logical network is reserved for use by at least a second plurality of endpoint devices of at least a second entity. The processing system may then merge the first logical network and the second logical network to create a merged logical network, in response to the detecting of the condition. The merging may include allocating a set of network resources to the merged logical network and authorizing the first plurality of endpoint devices and the second plurality of endpoint devices to access the merged logical network.

20 Claims, 3 Drawing Sheets

FILTERED COMMUNICATIONS IN NETWORK OF NETWORKS

The present disclosure relates generally to communication network operations, and more particularly to methods, computer-readable media, and apparatuses for merging a first logical network reserved for use by at least a first plurality of endpoint devices of at least a first public service entity and a second logical network to create a merged logical network.

BACKGROUND

In many large-scale public emergencies, personnel of public service entities (PSEs) may collaborate in an affected area. Typically, personnel of one PSE may undergo manual assurance and validation processes and procedures before gaining access to information systems of one or more other PSEs. For example, when responding to an emergency utility workers, emergency medical service (EMS) personnel, or law enforcement personnel may need to share critical information, but may need to seek out authorized personnel from another entity to obtain such information.

SUMMARY

In one example, the present disclosure describes a method, computer-readable medium, and apparatus for merging a first logical network reserved for use by at least a first plurality of endpoint devices of at least a first public service entity and a second logical network to create a merged logical network. For example, a processing system including at least one processor deployed in a communication network may detect a condition for merging at least a first logical network of the communication network and a second logical network of the communication network. The first logical network may be reserved for use by at least a first plurality of endpoint devices of at least a first public service entity, and the second logical network is reserved for use by at least a second plurality of endpoint devices of at least a second entity. The processing system may then merge the first logical network and the second logical network to create a merged logical network, in response to the detecting of the condition. The merging may include allocating a set of network resources to the merged logical network and authorizing the first plurality of endpoint devices and the second plurality of endpoint devices to access the merged logical network.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
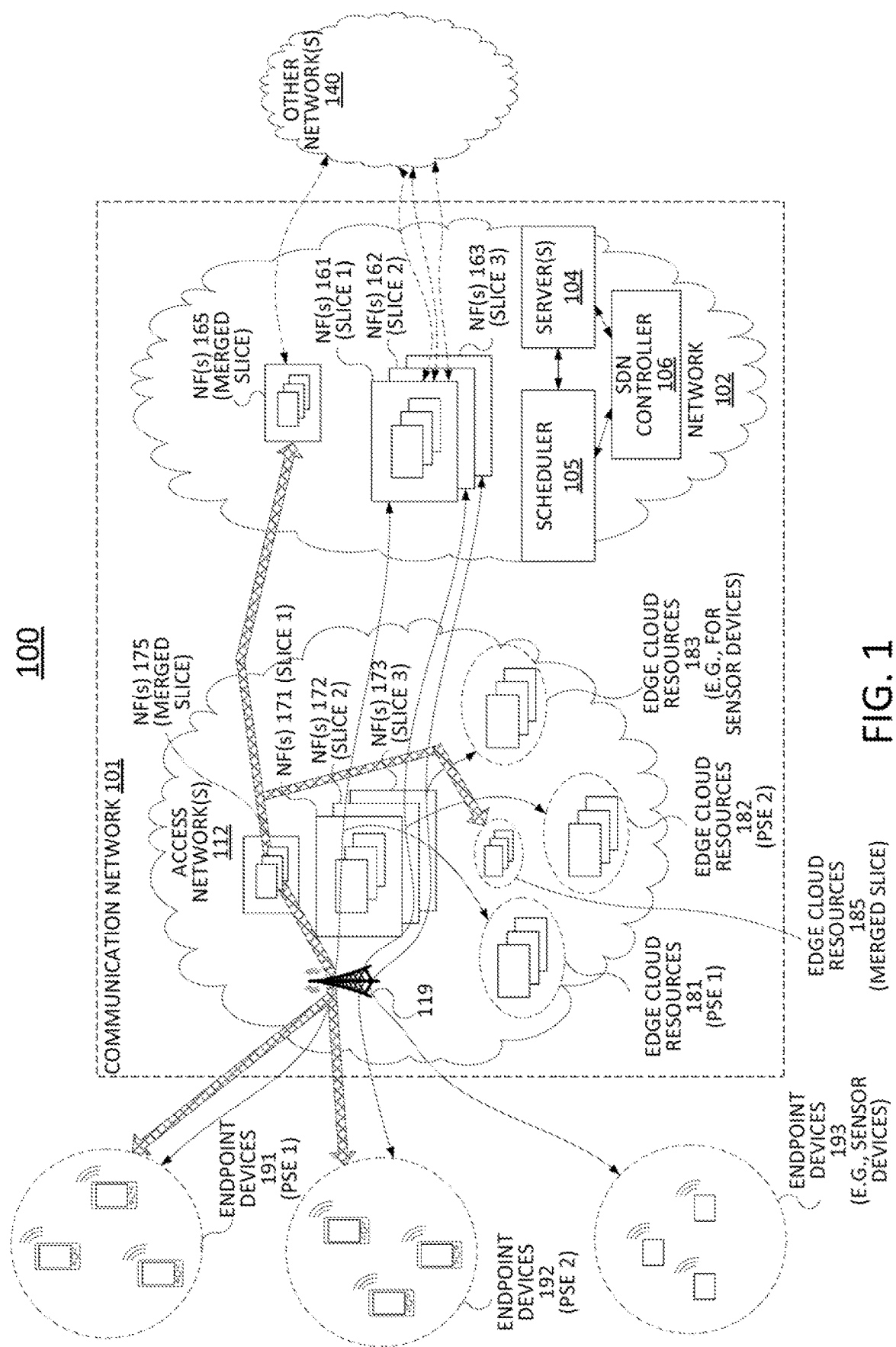
FIG. 1 illustrates an example network related to the present disclosure.

Examples of the present disclosure provide methods, computer-readable media, and apparatuses for merging a first logical network reserved for use by at least a first plurality of endpoint devices of at least a first public service entity and a second logical network to create a merged logical network. To illustrate, in a situation where public service entities (PSEs) may need to communicate with a large number of people for a specific period of time, e.g., at a specific location and/or following a specific incident, examples of the present disclosure provide for an independent, self-established, self-contained "network of networks" (NoN) that will enable group members to communicate quickly and securely, while also providing for selective sharing of information with specific users, groups of users, or roles. In one example, the present disclosure also enables public service entities to integrate sensor networks or the like, e.g., smart city sensors, smart home/building sensors, controllable roadway resources, business/organization communication and security systems, and so forth to create a strategic communication group for a particular incident. For example, in the event of a fire, earthquake, or other emergency incidents, it may be necessary to locate personnel working in a facility and to dispatch first responders to specific locations, which may benefit from close integration of a first responder network and a building sensor network or the like.

It should be noted that in one example, the respective networks that may be integrated into a network-of-networks may comprise logical networks established by a communication network and designated/reserved for endpoint devices associated with specific entities or classes of entities. For instance, public service entities (PSEs) may have one or more dedicated network slices to support reliable communication and data access needs. In one example, PSEs, such as utilities, emergency medical service (EMS), law enforcement, fire department, etc., may have separate dedicated network slices. In addition, a sensor network may have another dedicated network slice (e.g., for machine-type communication (MTC)). Each network slice may have a dedicated set of network resources which may include hardware components, network functions (physical or virtual), capacity allocations (e.g., bandwidth on a link, etc.), as well as service level and security targets, e.g., minimum throughput, uptime, priority, etc.

Examples of the present disclosure may include a network-based platform for creating a self-established, self-contained network-of-networks, e.g., a merged logical network/slice or "merged network." In one example, a merged network may comprise less than a full slice, e.g., slicing out a subset of users, network functions, and resources without allocating end-to-end network resources and without involvement of the macro-network. By doing so, a strategic sub-network/group of networks can be dynamically (or by request) created and supported, integrated with edge resources, and eventually shut down in an automated fashion. In an illustrative example, the present disclosure may include initial situation analysis, which may be triggered by a specific incident/alert, e.g., by one or more designated users/authorized users, or automatically detected from one or more information feeds, such as a weather data feed, a law enforcement incident feed, etc. In one example, a user may request creation of a network of networks, or an artificial intelligence (AI) and/or machine learning (ML) module may detect conditions for establishing a network of networks. In one example, a network of networks may be allocated resources in accordance with a template, e.g., for incidents of a particular type, and/or using ML based selection learned from allocations of resources for past incidents of a same event type, involving the same entities, etc.

In one example, permissions, data ownership, security, hierarchy management, and so forth within a network of networks may be kept as close to those of the original slices/groups as possible. For instance, preexisting data that may be shared may be subject to the original restrictions of the data owning entity. In one example, new data that is generated during an event may be subject to the most restrictive rules/parameters/conditions, permissions, security, hierarchy, etc. from among the participating entities. For example, a "level 3" emergency medical technician (EMT) of a first PSE may be permitted to access all incident video collected within the jurisdiction of the first PSE. However, a second PSE participating in a network of networks may not allow/enable level 3 EMTs to access such information. For instance, this may be reserved for police or fire personnel, or higher level supervisory personnel of an emergency medical service provider. Thus, all level 3 EMTs may be subject to more restrictive data access rules of the second PSE. However, in another example, a template for the network of networks creation may specify a different method of selecting the rules, permissions, etc. In many cases, these rules, permissions, etc. may be similar across different PSEs of a same type insofar as there may be collaboration on standard practices/best practices, etc.

In one example, a network of networks according to the present disclosure may enable filtered communications, applied on demand, to consolidate and report specific information to higher level authorities and/or to refine the recipients of various communications, e.g., limiting access to recipients by role, title, active status (e.g., on duty versus off duty), proximity to an event, etc. In one example, certain users/devices may be designated for "one-way communication only." For example, certain personnel may be inactive/off duty, but may assist on the next shift. They may continue to receive one-way communications to stay informed, but may temporarily be disabled from responding to alerts. Similarly, in one example, non-PSE users may temporarily be served by a network of networks (e.g., a merged, dedicated network slice) to receive alerts from a PSE. For example, personnel of a facility affected by a fire incident may receive alerts via a dedicated slice, e.g., with access network priority. However, members of the general public who may be nearby and who may attempt to live-stream the incident to a social media site may be served as general traffic. In one example, a merged slice/network of networks may enable device-to-device communication capabilities for low latency and to offload network resources. For instance, personnel in a remote area may be too far to converse in person, but may be close enough for their respective endpoint devices to communication via a 5G sidelink or other peer-to-peer communications. Meanwhile coverage of a closest base station may be less than ideal. In one example, a network of networks may be decommissioned upon request of one or more authorized users, or in accordance with AI/ML logic based upon detection of one or more end conditions. In one example, the existence of a network of networks may be time-bound. For instance, a duration, an end date/time, or the like may be specified at the inception and/or at any time during the existence of the network of networks.

Examples of the present disclosure may be used in connection with various incidents to connect specific groups of PSEs, e.g., police with firefighters, EMS with an electric utility (e.g., where it may be useful to temporarily disconnect power from a building), and so forth. Examples of the present disclosure may be used to disseminate messages to customized groups of PSE personnel, which in one example may include one way communications. It should be noted that one way communications may also be from individual users to a monitoring personnel or others. For instance, a first responder may wish to alert others to a danger, without revealing the first responder's location to others in the immediate vicinity with an audible incoming response message.

In one example, a network of networks may be further modified after initial establishment in response to user requests and/or triggers/conditions. For instance, it may become useful to pull in other groups of people, merge another network slice into the network of networks/merged slice (e.g., after a fire department network slice and a utility company network slice are joined, it may be desired to also pull in a network slice for a building sensor network), join a merged network slice that comprises local resources into the macro-network, and so forth. In this regard, it should also be noted that AI/ML may similarly be used to dynamically create a new group and improve infrastructure. In addition, one or more network slices may be removed from a network of networks, e.g., before the network of networks is fully disbanded. In other words, examples of the present disclosure may enable network slices and/or groups of users to enter and exit a network of networks.

In one example, a network of networks may connect to and/or may comprise edge cloud resources to facilitate smaller group communications and/or low latency network of networks communications. In one example, edge optimization techniques may be applied, e.g., to recognize when communication are local only and to avoid a macro-network, etc., to replicate resources existing in a PSE network slice that may be used in a merged network slice as described herein, and so forth. For instance, this may include placing a video cache in the edge cloud for storage of and access to incident videos recorded by personnel, vehicle dashboard cameras, and so forth. In one example, a merged network/network of networks may support multiple modes of communication: such as two-way and group audio, push to talk (PTT), visual/video conference, augmented reality/extended reality communication, text/short message service (SMS) and/or multimedia messaging service (MMS) messages, one way broadcast audio, video, or other media, and so forth. In one example, non-homogenous communication modes may be supported based on user device capabilities. In one example, a network of networks may be managed/controlled by one or more designated personnel and/or endpoint devices, e.g., from a PSE, or from two or more PSEs participating as peers. For instance, a fire commander and a police commander may together establish and disband a network of networks. In one example, one or both of these individuals may be designated as an overall coordinator for the network of networks (or a different individual may be selected and designated by both).

Thus, examples of the present disclosure include AI/ML-applied dynamic or user requested network of networks (NoN) creation, and AI/ML-based removal and disbanding of a network of networks, e.g., once an incident is complete/ closed. Examples of the present disclosure also provide for adaptive permissions, security, hierarchy, and multi-modal management within a network of networks. In one example, filtered communication to facilitate information transfer for targeted audiences, and addition and removal of specific users or user groups for one-way communication are also provided. In addition, examples of the present disclosure support multi-modal communication (e.g., audio, video, AR/XR, etc.) and may adapt/adjust to user device capabilities. Moreover, edge resources, including network functions, spectrum, bandwidth, etc. may be dynamically allocated based on prioritized network of networks groups.

It should be noted that some examples of the present disclosure are described herein illustratively in connection with first responders (e.g., firefighters, police, emergency medical service (EMS) personnel, etc.) and/or governmental or quasi-governmental entities (e.g., military, public health entities, hazardous materials (hazmat) units, etc.) that are entitled to access and utilize a priority network, or priority network slice(s). However, examples of the present disclosure may also include other PSEs that may provide important services in emergencies and disaster situations. For instance, this can include electric, water, gas, and sewerage utilities, and so forth. In addition, examples of the present disclosure may also include other entities that may be assigned dedicated network slices, e.g., for machine-type communications, such as sensor networks. These and other aspects of the present disclosure are discussed in greater detail below in connection with the examples of FIGS. 1-3.

To further aid in understanding the present disclosure, FIG. 1 illustrates an example system 100 in which examples of the present disclosure may operate. The system 100 may include any one or more types of communication networks, such as a traditional circuit switched network (e.g., a public switched telephone network (PSTN)) or a packet network such as an Internet Protocol (IP) network (e.g., an IP Multimedia Subsystem (IMS) network), an asynchronous transfer mode (ATM) network, a wireless network, a cellular network (e.g., 2G, 3G, 4G, 5G and the like), a long term evolution (LTE) network, and the like, related to the current disclosure. It should be noted that an IP network is broadly defined as a network that uses Internet Protocol to exchange data packets. Additional example IP networks include Voice over IP (VoIP) networks, Service over IP (SoIP) networks, and the like.

In one example, the system 100 may comprise a communication network 101. The communication network 101 may include a network 102 (e.g., a core network) and one or more access networks 112. The network 101 may be in communication with one or more other networks 140 (e.g., another communication network, e.g., a cellular network, and/or the Internet in general). In one example, network 102 may combine core network components of a cellular network with components of a triple play service network; where triple-play services include telephone services, Internet services and video services (e.g., television services) to subscribers. For example, network 102 may functionally comprise a fixed mobile convergence (FMC) network, e.g., an IP Multimedia Subsystem (IMS) network. In addition, network 102 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. Network 102 may further comprise a video broadcast network, e.g., a traditional cable provider network or an Internet Protocol Television (IPTV) network, as well as an Internet Service Provider (ISP) network. In one example, network 102 may include network functions (NFs) 161-163 for one or more dedicated slices, "network slices," which may be reserved for first responders and/or governmental entities, quasi-governmental entities, sensor networks, and so forth. For instance, NF(s) 161 may comprise cellular core network components allocated for a first PSE (PSE 1), and users associated with such an entity and/or their endpoint devices (e.g., endpoint devices 191), while other users, entities, and/or their endpoint devices may be serviced by a different network slice, or slices (such as NF(s) 162 for PSE 2 and endpoint devices 192, and NF(s) 163 for endpoint devices 193, which may comprise sensor devices of a "smart city," a particular building, campus, or the like, etc.). As noted above, NFs may include hardware components, network functions (physical or virtual), and capacity allocations (e.g., bandwidth on a link, etc.). It should be noted that a "slice" may be further characterized by service level and security targets, e.g., minimum throughput, uptime, priority, etc. As described in greater detail below, network 102 may also include NF(s) 165 for a merged slice, one or more server(s) 104, a scheduler 105, and a software defined network (SDN) controller 106. For ease of illustration, various additional elements of network 102 are omitted from FIG. 1.

In one example, the access network(s) 112 may comprise fiber optic access networks (e.g., fiber to the curb (FTTC) and/or fiber to the premises (FTTP) access networks), Digital Subscriber Line (DSL) networks, public switched telephone network (PSTN) access networks, broadband cable access networks, Local Area Networks (LANs), wireless access networks (e.g., an IEEE 802.11/Wi-Fi network and the like), cellular access networks, 3rd party networks, and the like. For example, the operator of communication network 101 may provide data services, voice/telephony services, video services, or any other types of communication service to subscribers via access network(s) 112. In one example, the access network(s) 112 may comprise different types of access networks, may comprise multiple instances of a same type of access network, or some access networks may be the same type of access network and other may be different types of access networks. In one example, the communication network 101 may be operated by a communication network service provider. In one example, access network(s) 112 may include at least one access point, such as a cellular base station, non-cellular wireless access point, a digital subscriber line access multiplexer (DSLAM), a cross-connect box, a serving area interface (SAI), a video-ready access device (VRAD), or the like, for communication with various endpoint devices. For instance, as illustrated in FIG. 1, access network(s) 112 may include at least wireless access point 119 (e.g., a cellular base station, such as an eNodeB, a gNB, or the like).

In one example, the access network(s) 112 may be in communication with various devices, local networks, and/or computing systems/processing systems. For instance, the access networks 112 may be in communication with endpoint devices 191 of PSE 1, endpoint devices 192 of PSE 2, and endpoint devices 193. In one example, endpoint devices 191 and 192 may comprise various computing devices (broadly "endpoint devices") that may be used by participants/users to communicate with each other, to access resources, to generate audio, video, images, or other records, and to perform various other tasks. For instance, endpoint devices 191 and 192 may include mobile computing devices such as smart phones, laptop computers, tablet computing devices, wearable computing devices (e.g., augmented reality (AR) headsets, eye glasses, goggles, smartwatches, etc.), or the like. Endpoint devices 191 and 192 may be equipped with wired and/or wireless networking/communication capability. In this regard, endpoint devices 191 and 192 may each include transceivers for wireless communications, e.g., for Institute for Electrical and Electronics Engineers (IEEE) 802.11 based communications (e.g., "Wi-Fi"), IEEE 802.15 based communications (e.g., "Bluetooth," "ZigBee," etc.), cellular communication (e.g., 3G, 4G/LTE, 5G, etc.), and so forth. Endpoint devices 191 and 192 may be associated with users/personnel of PSE 1 and PSE 2, respectively. In one example, endpoint devices 191 and 192 may comprise PSE-managed devices. In one example, endpoint devices 191 and 192 may be further associated with communication network 101. For instance, subscriber identity modules (SIMs) of endpoint devices 191 and 192 may be associated with communication network 101 and may permit the usage of communication network 101 for various communication services (e.g., via access network(s) 112). Devices 193 may comprise Internet of Things (IoT)/sensor devices, such as building sensors, weather sensors, controllable roadway resources, smart city sensors, etc.

As illustrated in FIG. 1, access network(s) 112 may include network functions (NFs) 171-173, which may be associated with network slices 1-3, respectively. For instance, NF(s) 171 may comprise access network components that service a first PSE (PSE 1), while other users, entities, and/or their endpoint devices may be serviced by a different network slice, or slices (such as NF(s) 172 for PSE 2 and endpoint devices 191, and NF(s) 173 for endpoint devices 193). Notably, NF(s) 171-173 may include access network hardware components, access network functions (physical or virtual), and capacity allocations (e.g., bandwidth reservations/guarantees, spectrum/carrier allocations, slots, etc.). It should be noted that a "slice" may be further characterized by service level and security targets in access network(s) 112, e.g., minimum throughput, uptime, priority, call failure rate, dropped call rate, etc. As described in greater detail below, access network(s) 112 may also include NF(s) 175 for a merged network slice, which may be of a same or similar nature as NF(s) 171-173.

In addition, as further illustrated in FIG. 1, access network(s) 112 may include sets of edge cloud resources 181-183 (e.g., for PSE 1, PSE, 2, and sensor devices, respectively). The edge cloud resources 181-183 may include host devices, e.g., computing resources comprising processors, e.g., central processing units (CPUs), graphics processing units (GPUs), programmable logic devices (PLDs), such as field programmable gate arrays (FPGAs), or the like, memory, storage, and so forth. In an example where the access network(s) 112 comprises radio access networks, the edge cloud resources 181-183, and other components of the access network(s) 112 may be referred to as a mobile edge infrastructure. The edge cloud resources 181-183 may comprise servers hosting virtualization platforms for managing one or more virtual machines (VMs), containers, microservices, or the like.

In one example, the edge cloud resources 181-183 may comprise components of and/or be collocated with the wireless access point 119. Alternatively, or in addition, any one or more of the edge cloud resources 181-183 may be a component of and/or be collocated with an aggregation point (not shown) that may service multiple access points, e.g., a plurality of base stations. Similarly, any one or more of the edge cloud resources 181-183 may be a component of and/or be collocated with a radio network controller (RNC) or the like of a respective one of the access network(s) 112.

In accordance with the present disclosure, the edge cloud resources 181-183 may be made available to host client services and may be managed and coordinated by scheduler 105. For instance, in one example, the edge cloud resources 181-183 may be configured to receive and respond to requests for availability from scheduler 105, to provide offers to host client services, to respond to instructions from scheduler 105 to host client services, to obtain images, codes, application data, media content, and other data to instantiate and host a client service from scheduler 105 or from one or more network-based repositories storing such data, to respond to instructions from scheduler 105 to release client services, and so forth. In one example, communication network 101 may provide a service for hosting client services on cloud infrastructure to subscribers, e.g., in addition to phone, video, and/or other telecommunication services. The clients may comprise individuals or may comprise enterprises, such as a content distribution network (CDN), a video streaming provider, a gaming service provider, or other application providers, PSEs, or personnel of communication network 101 itself. In addition, the edge cloud resources 181-183 may be configured to interact with other computing resources external to the access network(s) 112, such as components of network 102, endpoint devices 191-193, devices in other networks 140 (or accessible via other networks 140), and so forth. In one example, edge cloud resources 181-183 may be part of the respective network slices 1-3. Alternatively, edge cloud resources 181-183 may be accessible over access network(s) 112 via the network slices 1-3, respectively. As described in greater detail below, access network(s) 112 may also include edge cloud resources 185, e.g., for a merged network slice and/or the users/endpoint devices permitted access thereto. The edge cloud resources 185 may be of a same or similar nature as edge cloud resources 181-183.

It should be noted that in one example, NF(s) 161-163 and NF(s) 171-173 may comprise network function virtualization infrastructure (NFVI), e.g., for software defined network (SDN) services of an operator of the communication network 101, such as virtual mobility management entities (vMMEs), virtual serving gateways (vSGWs), virtual packet data network gateways (vPDNGWs or VPGWs) or other virtual network functions (VNFs). In such an example, the service provider VNFs may be logically separated from any client services which may be allowed to be instantiated on the same mobile edge infrastructure. In another example, nodes hosting client services may be collocated with, but physically separate from any servers which may comprise NFVI for service provider functions/VNFs. For instance, edge cloud resources 181-183 may be reserved for client services, while NF(s) 171-173 may represent separate physical and logical components reserved for service provider functions/VNFs.

In such an example, the NF(s) 171-173, and the VNFs instantiated thereon, may be controlled and/or managed by the SDN controller 106 and/or the scheduler 105. For instance, in one example, SDN controller 106 is responsible for such functions as provisioning and releasing instantiations of VNFs to perform the functions of routers, switches, and other devices, provisioning routing tables and other operating parameters for the VNFs, and so forth. In one example, SDN controller 106 may maintain communications with VNFs and/or host devices/NFVI (e.g., NF(s) 161-163 and 171-173) via a number of control links which may comprise secure tunnels for signaling communications over an underling IP infrastructure of communication network 101. In other words, the control links may comprise virtual links multiplexed with transmission traffic and other data traversing communication network 101 and carried over a shared set of physical links. For ease of illustration the control links are omitted from FIG. 1. In one example, the SDN controller 106 may also comprise a virtual machine operating on NFVI/host device(s), or may comprise a dedicated device.

As noted above, network 102 may also include server(s) 104. In one example, each of the server(s) 104 may comprise a computing system or server, or one or more computing systems or servers, such as computing system 300 depicted in FIG. 3, and may individually or collectively be configured to perform operations or functions for merging a first logical network reserved for use by at least a first plurality of endpoint devices of at least a first public service entity and a second logical network to create a merged logical network (such as illustrated and described in connection with the example method 200 of FIG. 2). Similarly, scheduler 105 and SDN controller 106 may each comprise one or more computing systems or servers, such as computing system 300 depicted in FIG. 3, and may individually or collectively be configured to perform operations or functions in connection with various examples of the present disclosure.

Figure 3:
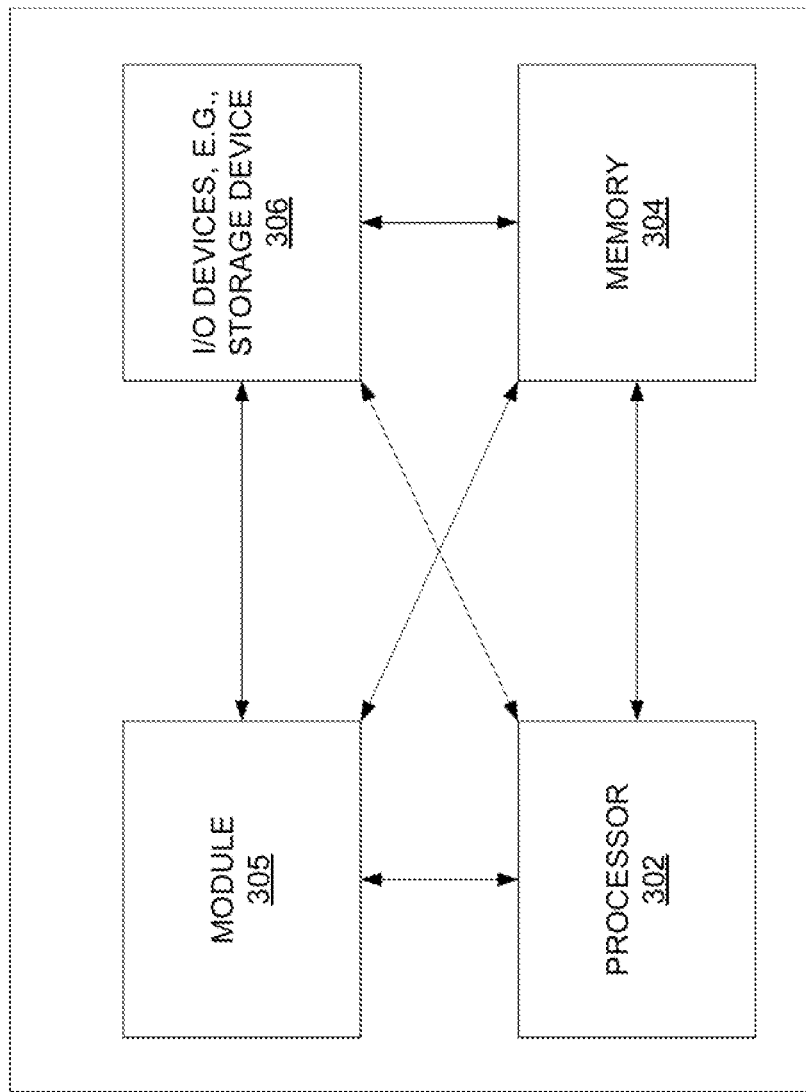
FIG. 3 illustrates a high level block diagram of a computing device specifically programmed to perform the steps, functions, blocks and/or operations described herein.

It should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 3 and discussed below) or multiple computing devices collectively configured to perform various steps, functions, and/or operations in accordance with the present disclosure.

In an illustrative example, server(s) 104 may detect a condition for merging at least a first logical network, e.g., a first network slice, and a second logical network, e.g., a second network slice, of the communication network 101. For instance, the first network slice may be network slice 1, associated with PSE 1, and network slice 2, associated with PSE 2. The condition may comprise an instruction from one or more endpoint devices of one or more authorized users. For instance, a fire commander, a police chief, or the like associated with PSE 1 or PSE 2 may declare a condition, e.g., the occurrence of an event or incident, which initiates a creation of a network of networks, or merged logical network/slice. In one example, a condition may be the receipt of declarations or instructions from endpoint devices of at least two authorized individuals (e.g., one of the endpoint devices 191 from PSE 1 and one of the endpoint devices from PSE 2). For example, a merged slice/logical network may be created when authorized personnel of two peer entities agree and declare to initiate a merged slice. Alternatively, or in addition, in one example, server(s) 104 may subscribe to one or more data feeds, e.g., weather data feeds, incident data feeds, etc. and may determine the occurrence of the condition based upon AI and/or ML logic implemented by the server(s) 104.

Server(s) 104 may merge the first logical network (e.g., network slice 1) and the second logical network (e.g., network slice 2) to create a merged logical network (e.g., a merged network slice), in response to the detecting of the condition. For instance, this may include allocating a set of network resources to the merged network slice. In one example, this may include allocation of at least NF(s) 175 of access network(s) 112. In one example, at least a portion of the allocated network resources may be reassigned from NF(s) 171 and/or NF(s) 172. In one example, the set of network resources allocated to the merged network slice may include NF(s) 165 of network 102. In one example, at least a portion of the NF(s) 165 may be reassigned from NF(s) 161 and/or NF(s) 162. In one example, server(s) 104 may assign a logical network identifier to the merged slice/logical network and may authorize endpoint devices 191 and 192 to access the merged slice/logical network. It should be noted that while endpoint devices 191 and 192 may be generally permitted to access the merged slice/logical network, access to specific resources, the ability to communicate with certain users or groups of users via the merged slice, and so forth may be managed according to permissions, ownership, roles/titles, physical presence, or other factors in accordance with the preferences of PSE 1 and/or PSE 2, by agreement between PSE 1 and PSE 2, and/or according to a predefined template. For example, a predefined template may be created by PSE 1 and PSE 2 for particular conditions, e.g., events of a particular event type, such as: apartment building fire emergency, office building fire emergency, flooding incident, major sporting event, parade, etc., which may define particular roles/titles that may participate, the levels of access to preexisting data, levels of access to new data created during an event, etc., the ability to communicate with other users and the types of communications permitted, as well as condition(s) for ending the merged network slice, and so forth.

In one example, endpoint devices 191 and 192 may access the merged slice/logical network in accordance with the logical network identifier. For instance, one or more applications on endpoint devices 191 and 192 may be configured to provide a network slice identifier in connection with establishing a user equipment (UE) context or the like. In one example, the network slice identifier may be received by an access point, such as wireless access point 119, which may serve the endpoint device via the merged network slice, e.g., NF(s) 175. Alternatively, or in addition, the network slice identifier may be received by another component of access network(s) 112 and/or network 102, which may similarly establish a context for the endpoint device in accordance with the merged slice, e.g., NF(s) 165. For instance, the network slice identifier may be received by an access and mobility management function (AMF) (not shown), which may perform registration management, connection management, endpoint device reachability management, mobility management, access authentication and authorization, security anchoring, security context management, coordination with non-5G components, and so forth. A network slice selection function (NSSF) (not shown) may select a network slice or network slices to serve an endpoint device, or may indicate one or more network slices that are permitted to be selected to serve an endpoint device. For instance, in one example, the AMF may query the NSSF with respect to one or more network slices in response to a request from an endpoint device to establish a session to communicate with a PDN. The NSSF may provide the selection to the AMF, or may provide one or more permitted network slices to the AMF, where the AMF may select the network slice from among the choices.

It should again be noted that a network slice may comprise a set of network resources, e.g., cellular network components, such as AMF(s), session management functions (SMF(s)), user plane function (UPF(s)), and so forth that may be arranged into different network slices which may logically be considered to be separate cellular networks. In any case, in one example, endpoint devices 191 and 192 may select to utilize the merged network slice in accordance with the network slice identifier that may be provided to communication network 101. For instance, an NSSF may authorize any one or more of endpoint devices 191 and 192 to utilize the merged network slice (e.g., comprising NF(s) 175, and in one example, also including NF(s) 165) based on the endpoint devices 191 and 192 being associated with PSE 1 and PSE 2, respectively. Alternatively, or in addition, endpoint devices 191 and 192 may further provide an access credential along with the request to utilize the merged network slice. For instance, when the merged network slice is created, a passcode, token, or the like may be provided to PSE 1 and PSE 2 for distribution to authorized users/personnel. As such, users/personnel may enter the code(s), activate the token(s), or the like via respective ones of the endpoint devices 191 and 192 for submission to the communication network 101 for context and/or session establishment.

In one example, communication network 101 may establish a communication between at least a first endpoint device, e.g., one of the endpoint devices 191, and at least a second endpoint device, e.g., at least one of the endpoint devices 192. Notably, in an illustrative example, the communication may be established locally to the access network portion via at least one access network resource, e.g., via NF(s) 175. In one example, the communication may further be established via wireless access point 119. In addition, in one example, the communication may also include edge cloud resources 185. In other words, the communication may not rely upon components of network 102. Rather, the communication may be between endpoint devices that are local to a same incident (and which may therefore connect to the same access network(s) 112, and in one example, via the same wireless access point 119). Moreover, all of these endpoint devices may be entitled to network services via a merged network slice.

As noted above, in one example, the communication may involve edge cloud resources 185. For example, the edge cloud resources 185 may include an incident response server that is allocated/tasked with coordinating communications among personnel from PSE 1 and PSE 2 responding to an incident. Thus, for example, the first endpoint device may identify recipients of a communication by role/title, and may direct the communication to the incident response server of edge cloud resources 185. The server may identify the recipient endpoint devices associated with the role(s)/title(s) identified, and may disseminate the communication accordingly. In other words, the communication may specify a filtered recipient group, e.g., from among endpoint devices 191 and endpoint devices 192. It should again be noted that the communication may be one of any number of modes of communication such as two-way and group audio, PTT, visual/video conference, augmented reality/extended reality communication, text/SMS and/or MMS messages, one way broadcast audio, video, or other media, and so forth.

In various examples, the at least the second endpoint device may also communicate with the at least the first endpoint device, e.g., local to the access network(s) 112 via one or more of the NF(s) 175 of the merged network slice (and in some examples including one or more of the edge cloud resources 185). However, in one example, communications among endpoint devices 191 and 192 may further include components of network 102, e.g., NF(s) 165 of the merged network slice. For example, there may be some personnel of PSE 1 and/or PSE 2 who are not local to the event/incident, but who may nevertheless initiate and/or receive various communications from other ones of the endpoint devices 191 and/or 192. Similarly, some types of communications may be served entirely locally, e.g., via access network(s) 112 without involvement of the macro-network (e.g., network 102), while others types of communications may call for the involvement of NF(s) 165. For instance, SMS messages may involve a short message service center (SMSC) or the like, which may be deployed in network 102 and not be available in the access network(s) 112.

As noted above, in one example, the edge cloud resources 185 may include at least one edge cloud resource from edge cloud resources 182 that is reassigned to the merged logical network. In one example, NF(s) 175 may further establish an access by the at least the first endpoint device to the at least one edge cloud resource that is reassigned to the merged logical network. In other words, the merged slice/logical network may enable access to at least one network-based resource from a different entity than a home entity of an endpoint device. As just one example, PSE 2 may have a fleet of drones which can provide recorded video to the edge cloud resources 182 (which in this example may be reassigned to edge cloud resources 185). As such, one or more personnel of PSE 1 via endpoint devices 191 may access the video(s) from the edge cloud resources 185 in accordance with the merged slice/logical network.

It should again be noted that in one example, NF(s) from NF(s) 171 and 172 may be reassigned to the merged network slice. In other words, one or more of NF(s) 175 may be borrowed from NF(s) 171 and/or NF(s) 172. In one example, the set of network resources allocated to the merged slice/logical network may alternatively or additionally comprise at least one new network resource (e.g., that was not previously part of NF(s) 171 and/or NF(s) 172). In one example, in addition to reconfiguration of the communication network 101 and elements thereof to establish a merged slice/logical network, permissions, security, and other aspects relating to edge cloud resources 185 may remain unchanged. For instance, one of the edge cloud resources 185 that is sourced from edge cloud resources 182 may have existing permissions for access by roles/titles/classes, which therefore extends access to endpoint devices 191 associated with such roles/titles/classes after inclusion in edge cloud resources 185. In one example, access to all or some of the edge cloud resources 185 may be restricted to the merged network slice. In other words, access may be denied when attempted via network slice 1 and/or network slice 2, etc. However, for edge cloud resources 185 sourced from edge cloud resources 181 or 182, respectively, endpoint devices previously having access via network slice 1 or network slice 2 may continue to have such access. For instance, some personnel of PSE 1 may not participate in an event/incident, but may still access data within the edge cloud resources 185 (e.g., sourced from edge cloud resources 181) for other purposes, and in one example, may do so via network slice 1.

It should be noted that the edge cloud resources 181-183 and 185 may include various applications, processes, functions, or the like, as well as various information/data resources, such as utility maps, recorded video, images, or the like, incident reports, property records (e.g., architectural plans, wiring diagrams, etc.), property ownership records, medical records, personnel records and contact information of various personnel a PSE, purchase order information (e.g., to order supplies, etc.), passcodes/keys (such as to disable or activate fire suppression systems, public announcement systems, etc.), and so forth. The nature of these resource(s) may vary depending upon the nature of the PSE(s) (e.g., first responders (e.g., firefighters, police, emergency medical service (EMS) personnel, etc.) and/or governmental or quasi-governmental entities (e.g., military, public health entities, etc.), utilities, and so forth). In one example, the edge cloud resources 181-183 and 185 may comprise one or more database servers storing information that may be accessed by personnel of PSE(s) (as well as guest users having temporary authorizations).

Similar to the foregoing, in one example, network slice 3 may alternatively or additionally be merged into the merged network slice. For instance, PSE 1 (e.g., a fire department), may benefit from real-time building sensor data to understand the status of elevators in a building (e.g., whether functional, which floor(s) the elevators are currently located, etc.), to obtain the temperatures of different floors or rooms (which may be indicative of fire), to locate missing persons (e.g., by detection of electronic employee badges, or the like), to obtain camera feeds, and so forth. For instance, endpoint devices 193 (e.g., sensor devices) may generally upload sensor data to the edge cloud resources 183 (and in one example to a long-term data repository, such as within or accessible via other networks 140). In this case, MTC communications of endpoint devices 193 for uploading sensor data may receive higher priority via the merged network slice, as compared to network slice 3. In one example, endpoint devices 191 may also communicate with endpoint devices 193 locally using the merged network slice (e.g., via NF(s) 175 without routing via network 102). For instance, one or more of the endpoint devices 191 may control a camera angle to obtain a better view of an incident, may activate a fire suppression system that did not automatically deploy in response to a fire, and so forth.

It should also be noted that FIG. 1 illustrates just one example topology of a system 100, and that various other examples may be provided. For instance, examples of the present disclosure may extend to multi-operator radio access networks (MORANs) and multi-operator core networks (MOCNs). For instance, access network(s) 112 may comprise a MORAN, where network slices from different entities may be associated with different operators/carriers (e.g., different core networks). However, in one example a merged network slice may involve local assets, without extending to the macro-network(s). Alternatively, or in addition, infrastructure of another communication network may also be pooled into a merged slice/network of networks (e.g., other access network(s) and/or another core network, etc.). In another example, access network(s) 112 may comprise a radio access network that is not shared as a MORAN, but that is capable of being so configured, and which may be activated as such. In one example, the present disclosure may also combine network slicing with private cellular networks. For instance, a private cellular network may become semi-public/shared for events in which a merged slice/network-of-networks is warranted. In one example, server(s) 104 may alternatively or additionally perform functions of scheduler 105 and/or SDN controller 106, as described above, or vice versa. In one example, functions of server(s) 104, scheduler 105, and/or SDN controller 106 may alternatively or additionally be deployed within access network(s) 112.

In addition, it should be noted that the system 100 has been simplified. Thus, the system 100 may be implemented in a different form than that which is illustrated in FIG. 1, or may be expanded by including additional endpoint devices, access networks, network elements, application servers, etc. without altering the scope of the present disclosure. In addition, system 100 may be altered to omit various elements, substitute elements for devices that perform the same or similar functions, combine elements that are illustrated as separate devices, and/or implement network elements as functions that are spread across several devices that operate collectively as the respective network elements. For example, the system 100 may include other network elements (not shown) such as border elements, routers, switches, policy servers, media streaming servers, security devices, gateways, a content distribution network (CDN) and the like. Thus, these and other modifications are all contemplated within the scope of the present disclosure.

Figure 2:
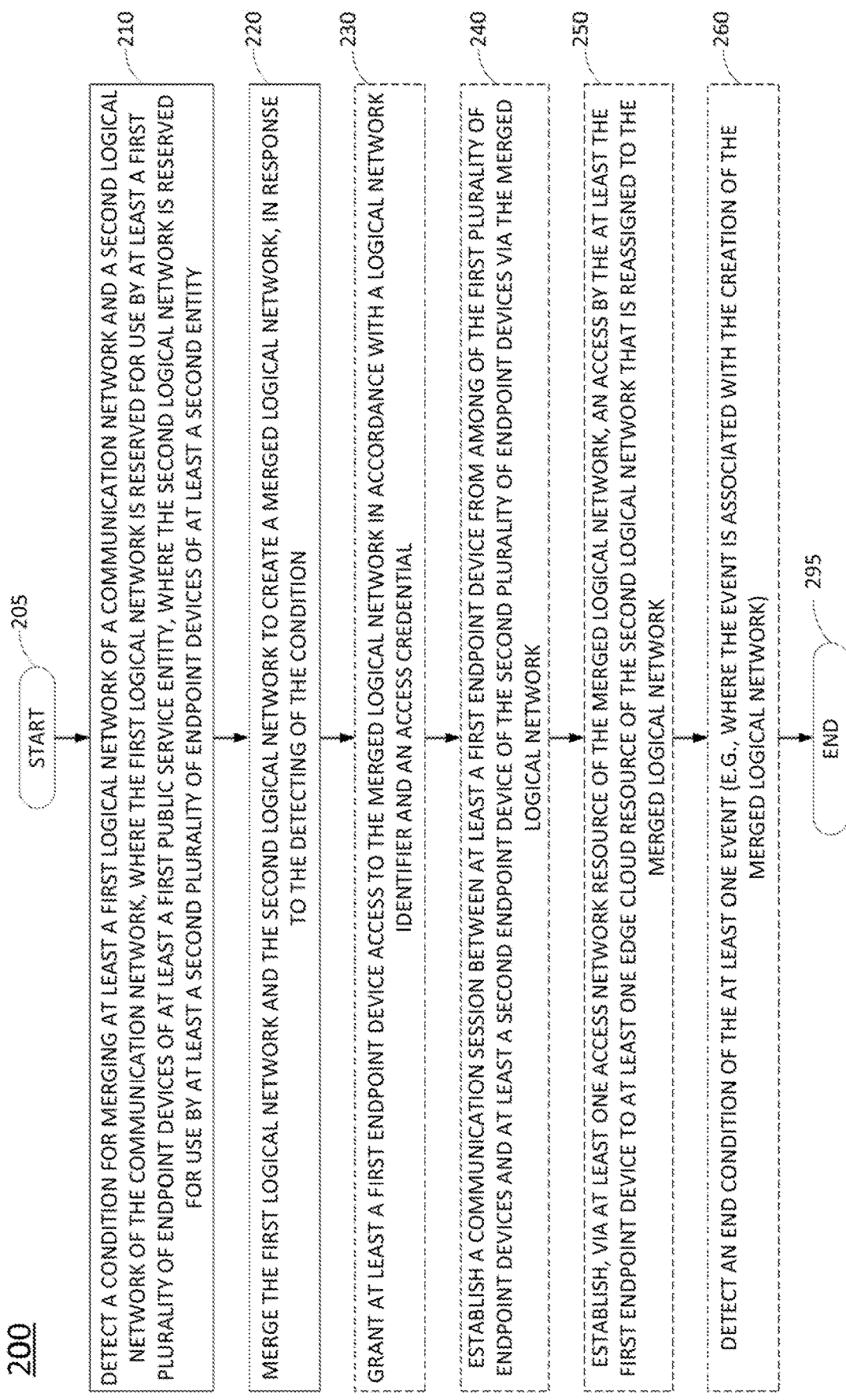
FIG. 2 illustrates a flowchart of an example method for merging a first logical network reserved for use by at least a first plurality of endpoint devices of at least a first public service entity and a second logical network to create a merged logical network.

FIG. 2 illustrates a flowchart of an example method 200 for merging a first logical network reserved for use by at least a first plurality of endpoint devices of at least a first public service entity and a second logical network to create a merged logical network. In one example, the method 200 is performed by a network-based component of the system 100 of FIG. 1, such as by server(s) 104, and/or any one or more components thereof (e.g., a processor, or processors, performing operations stored in and loaded from a memory), by any of such components with another one or more of such components and/or one or more other components of the system 100, such as NF(s) 175, NF(s) 165, SDN controller 106, scheduler 105, an AMF, an NSSF, and so forth. In one example, the steps, functions, or operations of method 200 may be performed by a computing device or system 300, and/or processor 302 as described in connection with FIG. 3 below. For instance, the computing device or system 300 may represent any one or more components of a device, server, and/or application server in FIG. 1 that is/are configured to perform the steps, functions and/or operations of the method 200. Similarly, in one example, the steps, functions, or operations of method 200 may be performed by a processing system comprising one or more computing devices collectively configured to perform various steps, functions, and/or operations of the method 200. For instance, multiple instances of the computing device or processing system 300 may collectively function as a processing system. For illustrative purposes, the method 200 is described in greater detail below in connection with an example performed by a processing system. The method 200 begins in step 205 and proceeds to step 210.

At step 210, the processing system, e.g., deployed in a communication network, detects a condition for merging at least a first logical network of the communication network and a second logical network of the communication network, e.g., where the first logical network is reserved for use by a first plurality of endpoint devices of at least a first public service entity (PSE) (e.g., law enforcement, fire, emergency medical services, hazmat, utility services, public transportation services, etc.), and where the second logical network is reserved for use by a second plurality of endpoint devices of at least a second entity. In one example, the second entity may be a second PSE. In another example, the second logical network may comprise a machine-type communication network slice and the second entity may be an entity that deploys a plurality of sensor devices using such a network slice. In other words, the second plurality of endpoint devices may comprise a plurality of sensor devices (which may include building sensors, controllable roadway resources or other controllable sensors, (e.g., cameras that can be reoriented, etc.), smart city sensors, and so forth). In one example, logical networks of multiple PSEs and at least one logical network for sensor devices may all be merged. In addition, in one example, the first logical network may comprise a first network slice of the communication network and the second logical network may comprise a second network slice of the communication network.

At step 220, the processing system merges the first logical network and the second logical network to create a merged logical network (e.g., a merged network slice, or "merged slice"), in response to the detecting of the condition. For instance, step 220 may include allocating a set of network resources to the merged logical network and authorizing the first plurality of endpoint devices and the second plurality of endpoint devices to access the merged logical network. In one example, step 220 may further include assigning a logical network identifier to the merged logical network. In one example, the set of resources may include at least one of: at least one network function, at least one radio access hardware component, or at least one non-hardware network capacity allocation. In one example, the communication network may include an access network portion (e.g., a radio access network). In this regard, it should be noted that the network functions may comprise at least one of: core network functions or radio access network functions. In one example, the set of resources may further include edge cloud resources associated with the access network portion. For instance, the edge cloud resources may be deployed in the access network portion (e.g., a radio access network) and/or tightly coupled to the access network portion (e.g., where reaching the edge cloud resources does not involve routing via a core network portion of the communication network and/or the Internet in general, etc.).

In one example, the set of resources may be allocated in accordance with a template associated with an event type, where the detecting of the condition includes detecting the event type. In one example, the event type can be designated by one or more authorized users (e.g., a police chief, a fire chief, etc. may declare an occurrence of an event/incident), or can be detected by AI/ML from one or more data feeds. In addition, in one example, the set of resources may be allocated according to AI/ML. For instance, the template may be an AI template, or resources may be selected via AI rules relating to the identities of the involved PSE(s), the location, the time of day, a "severity" of the event, which may be indicated by input from one or more authorized users, etc. Alternatively, or in addition, resources may be allocated according to a machine learning model (MLM), e.g., a trained machine learning algorithm (MLA) that may be trained and acquired from prior merged network setups, and feedback in terms of whether allocated resources were sufficient or not. In one example, the feedback may come from the user inputs, or can come from network performance data (e.g., indicators of whether service guarantees were met, whether resources were substantially over-provisioned in a given instance, and so forth).

It should be noted that as referred to herein a machine learning model (MLM) (or machine learning-based model) may comprise a machine learning algorithm (MLA) that has been "trained" or configured in accordance with input data (e.g., training data) to perform a particular service, e.g., to select a set of resources for a merged network slice optimized for events of a particular event type, and so forth. Examples of the present disclosure may incorporate various types of MLAs/models that utilize training data, such as support vector machines (SVMs), e.g., linear or non-linear binary classifiers, multi-class classifiers, deep learning algorithms/models, such as deep learning neural networks or deep neural networks (DNNs), generative adversarial networks (GANs), decision tree algorithms/models, k-nearest neighbor (KNN) clustering algorithms/models, and so forth. In one example, the MLA may incorporate an exponential smoothing algorithm (such as double exponential smoothing, triple exponential smoothing, e.g., Holt-Winters smoothing, and so forth), reinforcement learning (e.g., using positive and negative examples after deployment as a MLM), and so forth. In one example, MLMs of the present disclosure may be in accordance with a MLA/MLM template from an open source library, such as OpenCV, which may be further enhanced with domain specific training data. In one example, different MLMs may be trained and deployed for different event types, for different PSEs, and so forth.

In one example, the allocating of the set of resources to the merged logical network may include reassigning, to the merged logical network, at least a first network resource that was assigned to the first logical network. In one example, permissions and ownership associated with the at least the first network resource may remain unchanged after the allocating. For instance, access permission by role/title/class may persist, where additional users/endpoint devices from the second PSE having such role/title/class may also obtain access. In other words, the permissions may designate permitted access to the at least the first network resource by at least one class of users, where after the reassigning, at least a subset of the second plurality of endpoint devices associated with users of the at one class of users is permitted to access the at least the first network resource via the merged logical network. Similarly, in one example, the allocating of the set of resources to the merged logical network may include reassigning, to the merged logical network, at least a second network resource that was assigned to the second logical network, where permissions and ownership associated with the at least the second network resource are unchanged after the allocating. It should be noted that in one example, the set of network resources may alternatively or additionally comprise at least one new network resource (e.g., that was not previously associated with the first logical network or the second logical network). In such case, the assigning may include assigning the at least one new network resource to the merged logical network.

In one example, the authorizing of the first plurality of endpoint devices and the second plurality of endpoint devices to access the merged logical network may include associating device identifiers of the first plurality of endpoint devices and the second plurality of endpoint devices with the logical network identifier of the merged logical network. For instance, an AMF, an NSSF, or the like may be provided with a mapping of endpoint devices to permitted logical networks/slices. In one example, the authorizing may further include providing the logical network identifier of the merged logical network to the first plurality of endpoint devices and the second plurality of endpoint devices. In one example, the authorizing may further include providing an access credential to at least one organizer of the event, for dissemination to users associated with the first plurality of endpoint devices and the second plurality of endpoint devices (e.g., a password, token, or the like). It should be noted that in one example, the at least one organizer can be two or more organizers, e.g., where two different PSEs may participate as equal peers.

At optional step 230, the processing system may grant at least a first endpoint device access to the merged logical network in accordance with the logical network identifier and the access credential (e.g. in response to a presentation of the access credential via the at least the first endpoint device of the first plurality of endpoint devices to the processing system or to another network element designated by the processing system), and similarly for at least a second endpoint device of the second plurality of endpoint devices. In one example, optional step 230 may include establishing a UE context, or contexts for the endpoint device(s). For instance, in one example, one or more hardware resources of the merged logical network may be considered part of the processing system. Alternatively, or in addition, optional step 230 may be performed by an AMF, an NSSF, an access point, or the like in accordance with instructions from the processing system.

At optional step 240, the processing system may establish a communication session between at least a first endpoint device of the first plurality of endpoint devices and at least a second endpoint device of the second plurality of endpoint devices via the merged logical network. For instance, in one example, one or more hardware resources of the merged logical network may be considered part of the processing system. In this regard, it should be noted that in one example, the merged logical network may include at least one access network resource (of the set of resources) that is deployed in an access network portion of the communication network. In addition, in one example, the communication session may be established locally to the access network portion via at least one access network resource. For instance, as noted above, the access network portion may comprise a radio access network. Accordingly, in one example, the at least one access network resource may comprise the at least one radio access hardware component. In one example, a communication request from the first endpoint device may specify a filtered recipient group from among the first plurality of endpoint devices and the second plurality of endpoint devices, where step 240 may include establishing the communication session to the filtered recipient group via the at least one access network resource. The filtered recipient group may include the at least the second endpoint device. In one example, the filtered recipient group may be defined by one or more roles. In addition, in one example, the communication session may be for a one-way communication from the at least the first endpoint device to the at least the second endpoint device (e.g., to a filtered recipient group that includes the at least the second endpoint device). It should again be noted that the communication may be of one of any number of modes of communication such as two-way and group audio, PTT, visual/video conference, augmented reality/extended reality communication, text/SMS and/or MMS messages, one way broadcast audio, video, or other media, and so forth.

At optional step 250, the processing system may establish, via the at least one access network resource of the merged logical network, an access by the at least the first endpoint device to the at least one edge cloud resource of the second logical network that is reassigned to the merged logical network. For instance, as described above, the access may involve local resources, e.g., without routing via a core network/macro-network or the Internet in general, etc.

At optional step 260, the processing system may detect an end condition of the at least one event. For instance, in one example, optional step 260 may include obtaining a notification from an authorized user. In one example, the processing system may obtain external data from one or more sources that indicate an end condition. For instance, the processing system may monitor an XML weather data feed that indicates an emergency weather condition has ended. Alternatively, or in addition, the processing system may communicate with a PSE incident management system and/or endpoint devices of one or more authorized personnel, where an authorized personnel of the PSE may provide an input that declares the event has "ended." In one example, the end of an event may be determined when indicated by at least two authorized users/personnel, e.g., one from each of a first PSE and a second PSE participating in the merged logical network. In one example, step 260 may include decommissioning the merged slice/logical network in accordance with the detection of the end condition.

Following step 220 or any of optional steps 230-260, the method 200 proceeds to step 295 where the method ends.

It should be noted that the method 200 may be expanded to include additional steps, or may be modified to replace steps with different steps, to combine steps, to omit steps, to perform steps in a different order, and so forth. For instance, in one example, the processing system may repeat steps 210-240 or steps 210-260 for other incidents, steps 230-240 for other endpoint devices joining the merged logical network, and so forth. In one example, the method 200 may include gathering training data and training a MLM for resource selection. In one example, the method 200 may include providing access to one or more temporary users, e.g., not previously associated with the first PSE or the second PSE. For instance, members of the general public in an area may be designated for "receive only" access for their endpoint devices to be provided one-way alerts via the merged logical network, e.g., from a PSE. Other communications for these devices may still be served via another network slice, or slices designated for general users. In one example, the method 200 may be expanded or modified to include steps, functions, and/or operations, or other features described above in connection with the example(s) of FIG. 1, or as described elsewhere herein. Thus, these and other modifications are all contemplated within the scope of the present disclosure.

In addition, although not expressly specified above, one or more steps of the method 200 may include a storing, displaying and/or outputting step as required for a particular application. In other words, any data, records, fields, and/or intermediate results discussed in the method can be stored, displayed and/or outputted to another device as required for a particular application. Furthermore, operations, steps, or blocks in FIG. 2 that recite a determining operation or involve a decision do not necessarily require that both branches of the determining operation be practiced. In other words, one of the branches of the determining operation can be deemed as an optional step. Furthermore, operations, steps or blocks of the above described method(s) can be combined, separated, and/or performed in a different order from that described above, without departing from the example embodiments of the present disclosure.

FIG. 3 depicts a high-level block diagram of a computing device or processing system specifically programmed to perform the functions described herein. For example, any one or more components or devices illustrated in FIG. 1 or described in connection with the example(s) of FIG. 2 may be implemented as the processing system 300. As depicted in FIG. 3, the processing system 300 comprises one or more hardware processor elements 302 (e.g., a microprocessor, a central processing unit (CPU) and the like), a memory 304, (e.g., random access memory (RAM), read only memory (ROM), a disk drive, an optical drive, a magnetic drive, and/or a Universal Serial Bus (USB) drive), a module 305 for merging a first logical network reserved for use by at least a first plurality of endpoint devices of at least a first public service entity and a second logical network to create a merged logical network, and various input/output devices 306, e.g., a camera, a video camera, storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like).

Although only one processor element is shown, it should be noted that the computing device may employ a plurality of processor elements. Furthermore, although only one computing device is shown in the Figure, if the method(s) as discussed above is implemented in a distributed or parallel manner for a particular illustrative example, i.e., the steps of the above method(s) or the entire method(s) are implemented across multiple or parallel computing devices, e.g., a processing system, then the computing device of this Figure is intended to represent each of those multiple specific-purpose computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor 302 can also be configured or programmed to cause other devices to perform one or more operations as discussed above. In other words, the hardware processor 302 may serve the function of a central controller directing other devices to perform the one or more operations as discussed above.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computing device, or any other hardware equivalents, e.g., computer readable instructions pertaining to the method(s) discussed above can be used to configure a hardware processor to perform the steps, functions and/or operations of the above disclosed method(s). In one example, instructions and data for the present module or process 305 for merging a first logical network reserved for use by at least a first plurality of endpoint devices of at least a first public service entity and a second logical network to create a merged logical network (e.g., a software program comprising computer-executable instructions) can be loaded into memory 304 and executed by hardware processor element 302 to implement the steps, functions or operations as discussed above in connection with the example method(s). Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 305 for merging a first logical network reserved for use by at least a first plurality of endpoint devices of at least a first public service entity and a second logical network to create a merged logical network (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not limitation. Thus, the breadth and scope of a preferred embodiment should not be limited by any of the above-described example embodiments, but should be defined only in accordance with the following claims and their equivalents.

What is claimed is:

1. A method comprising:
   detecting, by a processing system including at least one processor deployed in a communication network, a condition for merging at least a first logical network of the communication network and a second logical network of the communication network, wherein the first logical network is reserved for use by at least a first plurality of endpoint devices of at least a first public service entity, wherein the second logical network is reserved for use by at least a second plurality of endpoint devices of at least a second entity; and
   merging, by the processing system, the first logical network and the second logical network to create a merged logical network, in response to the detecting of the condition, wherein the merging comprises:
      allocating a set of network resources to the merged logical network; and
      authorizing the first plurality of endpoint devices and the second plurality of endpoint devices to access the merged logical network.

2. The method of claim 1, wherein the at least the second entity comprises at least a second public service entity.

3. The method of claim 1, wherein the at least the second entity comprises an entity deploying the second plurality of endpoint devices, where the second plurality of endpoint devices comprises sensor devices, and wherein the second logical network is configured for machine-type communications.

4. The method of claim 1, wherein the first logical network comprises a first network slice of the communication network, and wherein the second logical network comprises a second network slice of the communication network.

5. The method of claim 1, wherein the merged logical network supports the establishment of a communication session between at least a first endpoint device of the first plurality of endpoint devices and at least a second endpoint device of the second plurality of endpoint devices, wherein the merged logical network includes at least one access network resource of the set of resources, that is deployed in an access network portion of the communication network, and wherein the communication session is established local to the access network portion via the at least one access network resource.

6. The method of claim 5, wherein the access network portion comprises a radio access network.

7. The method of claim 5, wherein a communication request for the communication session specifies a filtered recipient group from among the first plurality of endpoint devices and the second plurality of endpoint devices and wherein the establishing comprises routing a communication to the filtered recipient group via the communication session that is established via the at least one access network resource.

8. The method of claim 1, wherein the set of resources includes at least one of:
at least one network function;
at least one radio access hardware component; or
at least one non-hardware network capacity allocation.

9. The method of claim 8, wherein the at least one network function comprises at least one of:
a core network function; or
a radio access network function.

10. The method of claim 8, wherein the set of resources further includes:
edge cloud resources associated with the access network portion.

11. The method of claim 10, wherein the edge cloud resources include at least one edge cloud resource from the second logical network that is reassigned to the merged logical network, the method further comprising:
establishing, via the at least one access network resource of the merged logical network, an access by at least a first endpoint device of the first plurality of endpoint devices to the at least one edge cloud resource from the second logical network that is reassigned to the merged logical network.

12. The method of claim 1, wherein the authorizing comprises:
associating device identifiers of the first plurality of endpoint devices and the second plurality of endpoint devices with a logical network identifier of the merged logical network; and
providing the logical network identifier of the merged logical network to the first plurality of endpoint devices and the second plurality of endpoint devices.

13. The method of claim 12, wherein the authorizing further comprises:
providing an access credential to at least one organizer of the merged logical network, for dissemination to users associated with the first plurality of endpoint devices and the second plurality of endpoint devices.

14. The method of claim 13, wherein at least a first endpoint device of the first plurality of endpoint devices and at least a second endpoint device of the second plurality of endpoint devices are granted access to the merged logical network in accordance with the logical network identifier and the access credential.

15. The method of claim 1, wherein the allocating the set of network resources comprises:
reassigning, to the merged logical network, at least a first network resource that was assigned to the first logical network, wherein permissions and ownership associated with the at least the first network resource are unchanged after the allocating.

16. The method of claim 15, wherein the permissions designate a permitted access to the at least the first network resource by at least one class of users, wherein after the reassigning, at least a subset of the second plurality of endpoint devices associated with users of the at least one class of users is permitted to access the at least the first network resource via the merged logical network.

17. The method of claim 15, wherein the allocating the set of network resources further comprises:
reassigning, to the merged logical network, at least a second network resource that was assigned to the second logical network, wherein permissions and ownership associated with the at least the second network resource are unchanged after the allocating.

18. The method of claim 1, wherein the set of resources is allocated in accordance with a template associated with an event type, wherein the detecting of the condition includes detecting the event type.

19. A non-transitory computer-readable medium storing instructions which, when executed by a processing system including at least one processor deployed in a communication network, cause the processing system to perform operations, the operations comprising:
detecting a condition for merging at least a first logical network of the communication network and a second logical network of the communication network, wherein the first logical network is reserved for use by at least a first plurality of endpoint devices of at least a first public service entity, wherein the second logical network is reserved for use by at least a second plurality of endpoint devices of at least a second entity; and
merging the first logical network and the second logical network to create a merged logical network, in response to the detecting of the condition, wherein the merging comprises:
allocating a set of network resources to the merged logical network; and
authorizing the first plurality of endpoint devices and the second plurality of endpoint devices to access the merged logical network.

20. An apparatus comprising:
a processing system including at least one processor; and
a computer-readable medium storing instructions which, when executed by the processing system when deployed in a communication network, cause the processing system to perform operations, the operations comprising:
detecting a condition for merging at least a first logical network of the communication network and a second logical network of the communication network, wherein the first logical network is reserved for use by at least a first plurality of endpoint devices of at least a first public service entity, wherein the second logical network is reserved for use by at least a second plurality of endpoint devices of at least a second entity; and
merging the first logical network and the second logical network to create a merged logical network, in response to the detecting of the condition, wherein the merging comprises:
allocating a set of network resources to the merged logical network; and
authorizing the first plurality of endpoint devices and the second plurality of endpoint devices to access the merged logical network.

* * * * *